United States Patent
Storey et al.

(10) Patent No.: US 10,772,271 B2
(45) Date of Patent: Sep. 15, 2020

(54) RAPID TRANSPLANTING SYSTEM

(71) Applicant: MJNN, LLC, South San Francisco, CA (US)

(72) Inventors: Nathaniel R. Storey, Laramie, WY (US); Kevin Grauberger, Laramie, WY (US); Damon Henry Smith, Laramie, WY (US); Jonah Eskin, Fort Collins, CO (US)

(73) Assignee: MJNN, LLC, South San Francisco, CA (US)

(*) Notice: Subject to any disclaimer, the term of this patent is extended or adjusted under 35 U.S.C. 154(b) by 512 days.

(21) Appl. No.: 15/825,642

(22) Filed: Nov. 29, 2017

(65) Prior Publication Data

US 2018/0153113 A1    Jun. 7, 2018

Related U.S. Application Data

(60) Provisional application No. 62/430,561, filed on Dec. 6, 2016.

(51) Int. Cl.
| | |
|---|---|
| *A01C 11/02* | (2006.01) |
| *A01G 31/02* | (2006.01) |
| *A01G 9/08* | (2006.01) |
| *A01C 7/04* | (2006.01) |

(52) U.S. Cl.
CPC .............. *A01G 31/02* (2013.01); *A01C 11/02* (2013.01); *A01G 9/085* (2013.01); *A01C 7/042* (2013.01); *Y02P 60/216* (2015.11)

(58) Field of Classification Search
CPC .... A01G 31/02; A01G 31/042; A01G 31/045; A01G 9/08; A01G 9/081; A01G 9/083; A01G 9/085; A01G 9/088; A01C 11/02; A01C 11/025
USPC ................. 47/1.01 P, 1.7, 62 R, 65, 66.5, 77
See application file for complete search history.

(56) References Cited

U.S. PATENT DOCUMENTS

| | | | | |
|---|---|---|---|---|
| 4,970,972 A * | 11/1990 | Williames | ............ | A01C 11/025 111/111 |
| 5,415,115 A * | 5/1995 | Masuda | ................. | A01C 11/02 111/105 |
| 5,881,655 A * | 3/1999 | Edmonds | ............... | A01G 24/60 111/105 |
| 7,036,440 B1 * | 5/2006 | Sena | ..................... | A01C 11/025 111/105 |
| 7,051,475 B1 * | 5/2006 | Sena | ..................... | A01C 11/025 111/105 |

(Continued)

*Primary Examiner* — Peter M Poon
*Assistant Examiner* — Danielle A Clerkley
(74) *Attorney, Agent, or Firm* — Patent Law Office of David G. Beck

(57) ABSTRACT

A seedling transplanting system is provided that utilizes a seedling feeder that is configured to fit between a tray of seedlings contained within a series of chain pots and a hydroponic trough. The feeder includes a ramp and a chute that direct the seedlings from the tray into the trough. A pair of guide surfaces, which form ramp sidewalls, help the seedlings to self-right as they are drawn into the hydroponic trough. A restraining jig aids in establishing and maintaining the relative positions of the seedling tray, feeder and trough during the transplanting process. A pulling tool simplifies the transplanting process by providing means for pulling a pair of media strips along with the captured chain pots into the hydroponic trough.

20 Claims, 11 Drawing Sheets

(56) References Cited

U.S. PATENT DOCUMENTS

2017/0172084 A1\* 6/2017 Fox ................ A01G 22/00

\* cited by examiner

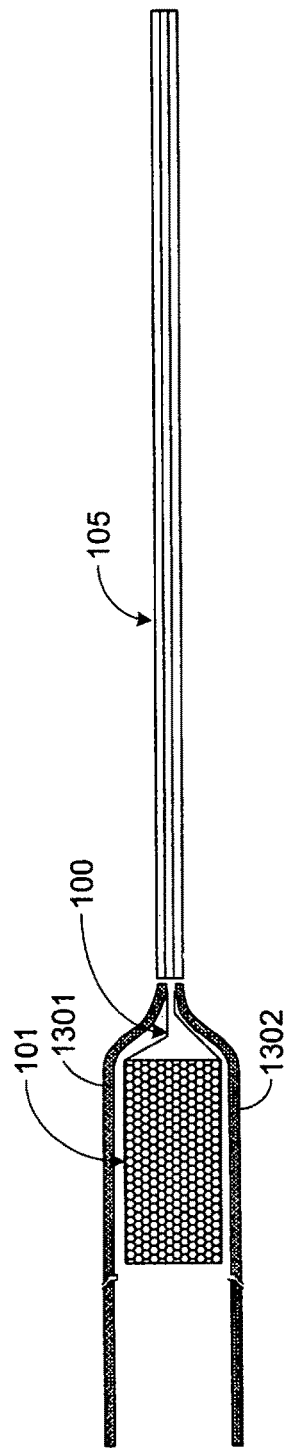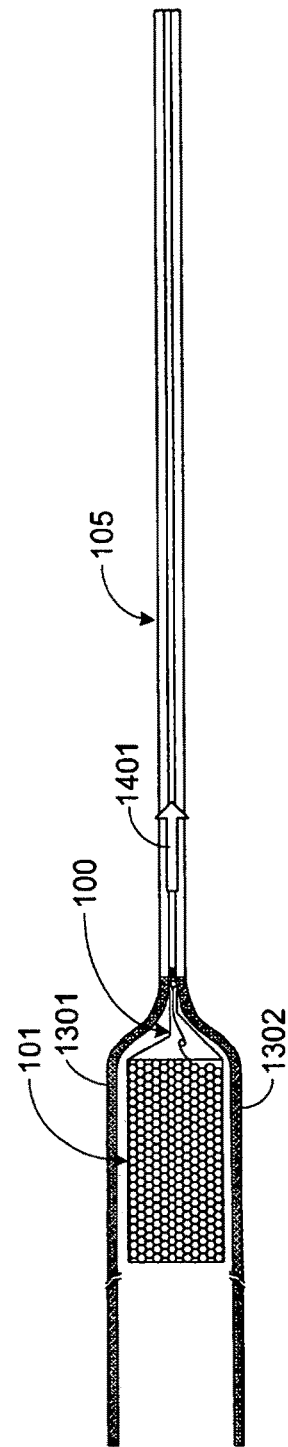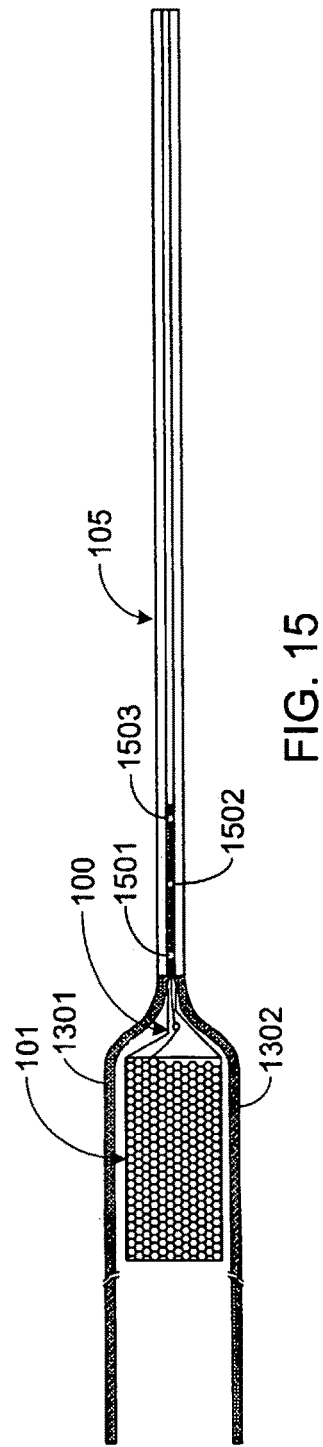

RAPID TRANSPLANTING SYSTEM

CROSS-REFERENCE TO RELATED APPLICATION

This application claims the benefit of the filing date of U.S. Provisional Patent Application Ser. No. 62/430,561, filed Dec. 6, 2016, the disclosure of which is incorporated herein by reference for any and all purposes.

FIELD OF THE INVENTION

The present invention relates generally to hydroponic growing systems and, more particularly, to a device and system configured to simplify and expedite the process by which seedlings are transplanted into a plant production system such as a hydroponic tower.

BACKGROUND OF THE INVENTION

Given the continued growth of the world's population, and given that the regions allocated for agricultural pursuits have decreased or simply become less favorable to such activities, the ability of conventional farms to feed the world's growing population has become increasingly taxed. Additionally, since population centers and agricultural centers are frequently not co-located, and due to the time and expense associated with shipping agricultural goods, in many regions of the world only the wealthy are able to obtain adequate supplies of non-processed food, i.e., raw fruits and vegetables. As a result, there has been a renewed interest in soilless growing techniques that offer a potential solution to many of these problems.

Hydroponics is a soilless growing technique in which plants are grown using a liquid solution of water and nutrients. The roots of the plants are typically maintained in a fibrous or granular material, often comprised of plastic, and fed via a wick, drip, nutrient film, or other nutrient delivery system. Hydroponic growing systems are often established within indoor facilities, thus allowing them to be located in or near population centers. This approach also provides exceptional climate control (i.e., temperature, humidity, air flow, $CO_2$ concentration, light wavelength, intensity and duration, etc.) as well as improved pest and disease control, thus allowing an indoor hydroponic farm to succeed in a region in which the outside environment and/or the soil conditions are inhospitable to the use of conventional farming techniques. Furthermore, hydroponic and other soilless growing techniques can yield extremely high plant densities, especially in those instances in which either horizontal stacking systems or vertical growth towers are used.

While hydroponic farming techniques offer a number of advantages over conventional farming techniques, large-scale adoption of these techniques requires that the cost per plant is competitive with conventional techniques. Accordingly, the present invention provides a means of simplifying and expediting the process by which seedlings are transplanted within a plant production system.

SUMMARY OF THE INVENTION

The present invention provides a seedling transplanting system comprised of a seedling feeder that is configured to fit between a seedling tray and a hydroponic trough during the transplanting process. The seedling tray includes a plurality of seedlings contained within a plurality of chain pots. The hydroponic trough may be configured to be placed in an upright, vertical position after completion of the seedling transplanting process. The seedling feeder includes (i) a ramp surface, where the seedlings from the seedling tray pass over the ramp surface during the transplanting process; (ii) a transition member located at a first end portion of the seedling feeder, where the transition member is configured to provide a transition surface between the seedling tray and the ramp surface; (iii) a feed chute located at a second end portion of the seedling feeder, where the second end portion is distal from the first end portion, and where the feed chute is configured to guide the seedlings passing over the ramp surface into the hydroponic trough; (iv) a first guide surface interposed between the transition member and the feed chute, where the first guide surface defines a first edge of the ramp surface, where the first guide surface extends upwards from the ramp surface to form a first ramp sidewall, and where the first guide surface angles away from the transition member at a first acute angle; and (v) a second guide surface interposed between the transition member and the feed chute, where the second guide surface defines a second edge of the ramp surface, where the second guide surface extends upwards from the ramp surface to form a second ramp sidewall, and where the second guide surface angles away from the transition member at a second acute angle, where the first acute angle is different from the second acute angle. The first and second guide surfaces are configured to right the seedlings during the transplanting process and before the seedlings move into the feeder chute. The first acute angle is preferably within the range of 25 to 45 degrees; the second acute angle is preferably within the range of 35 to 55 degrees; and the difference between the two acute angles is preferably within the range of 5 to 15 degrees.

In one aspect, the first guide surface forms a first obtuse angle, preferably in the range of 100 to 135 degrees, with the ramp surface, and the second guide surface forms a second obtuse angle, preferably in the range of 100 to 135 degrees, with the ramp surface.

In another aspect, the transition member may be configured to extend over a leading edge of the seedling tray, fitting at least partially within the tray. The transition member may include a pair of downwardly extending tabs configured to extend into the seedling tray during the transplanting process, thereby maintaining the relative positions of the seedling feeder and the seedling tray.

In another aspect, the first sidewall and the second sidewall of the feeder chute may be angled such that the chute width at the top of the chute is larger than the chute width at the bottom of the chute. Preferably the width of the feeder chute is +/−0.25 inches of the width of the slot within the hydroponic trough.

In another aspect, the transplanting system may include a restraining jig configured to hold the seedling tray during the transplanting process. The restraining jig may include one or more restraining pins configured to fit within a complimentary feature of the seedling tray. The restraining jig may include one or more locating pins configured to position the seedling tray within the restraining jig. The restraining jig may include a mounting bracket that is coupled to a lower surface of the restraining jig and configured to minimize restraining jig movement during the transplanting process. The restraining jig may include one or more pins configured to fit within a complimentary feature of the hydroponic trough.

In another aspect, the transplanting system may include a media strip pulling tool configured to pull a pair of media strips along with a plurality of chain pots captured between the media strips into the hydroponic trough during the transplanting process. The pulling tool preferably includes a plurality of barbs configured to pierce and seize the media strips. The transplanting system may further include a winch that is coupled to the pulling tool via a cable, where the winch is configured to pull the pulling tool, the pair of media strips, and the captured chain pots through the hydroponic trough during the transplanting process.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

FIG. 13 provides a schematic that illustrates the transplanting process;

FIG. 14 provides a similar schematic to that shown in FIG. 13 after the end portions of the media strips along with the first seedling have been fed into the trough;

FIG. 15 provides a similar schematic to that shown in FIGS. 13 and 14 after the first three seedlings have been pulled into the trough;

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

Figure 1:
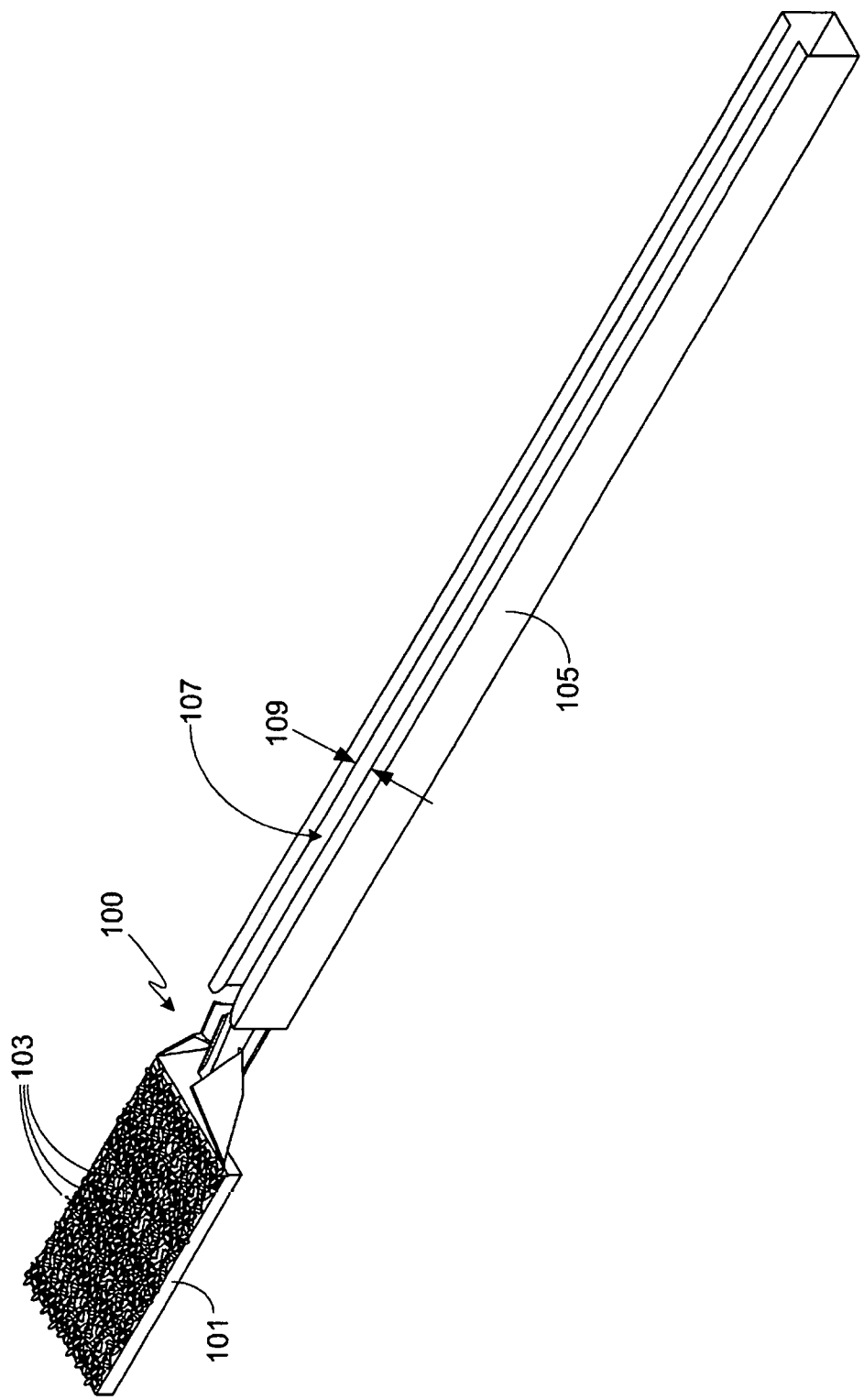
FIG. 1 illustrates the seedling feeder of the invention located between a seedling tray and a hydroponic trough.

FIG. 1 provides an overview of a seedling feeder 100 in accordance with the invention. In use and as illustrated in FIG. 1, seedling feeder 100 is located between a tray 101 containing a plurality of seedlings 103 and a hydroponic trough 105. During loading, trough 105 is preferably located on a horizontal or near horizontal surface, such as a table or work bench. While trough 105 may be used in a horizontal hydroponic growing system, preferably after loading trough 105 is re-positioned into a vertical, i.e., post-like, position appropriate for a vertical hydroponic farming system. As such, trough 105 is also referred to herein as a vertical tower or a hydroponic tower. Trough 105 is preferably extruded, although other fabrication techniques may be used in its manufacture. Preferably trough 105 is fabricated from plastic (e.g., polyethylene, polypropylene, polyvinyl chloride, polytetrafluoroethylene, etc.), although it can also be made of metal (e.g., aluminum) or other material.

Figure 2:
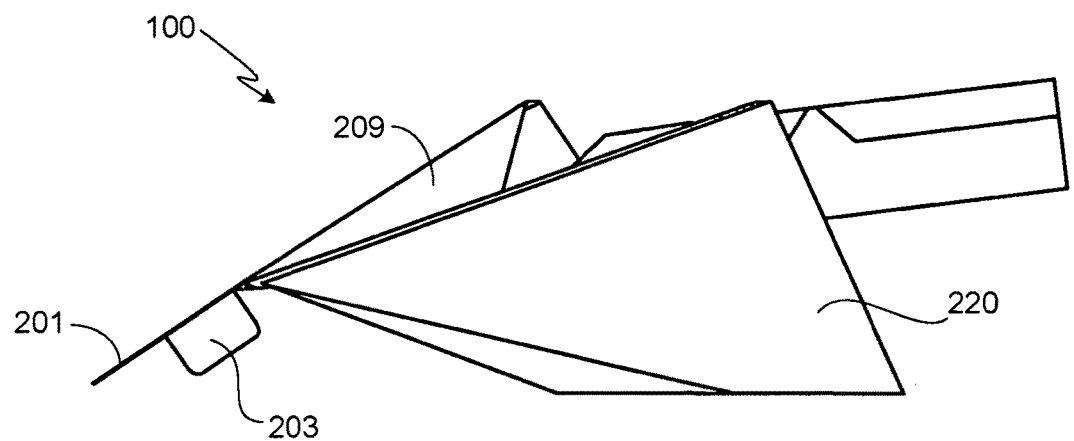
FIG. 2 provides a left perspective view of the seedling feeder shown in FIG. 1.
Figure 3:
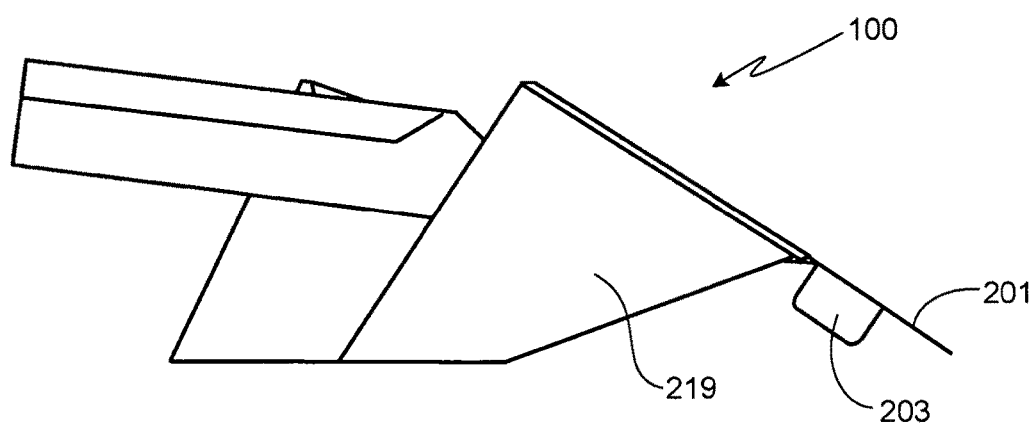
FIG. 3 provides a right perspective view of the seedling feeder shown in FIGS. 1 and 2.
Figure 4:
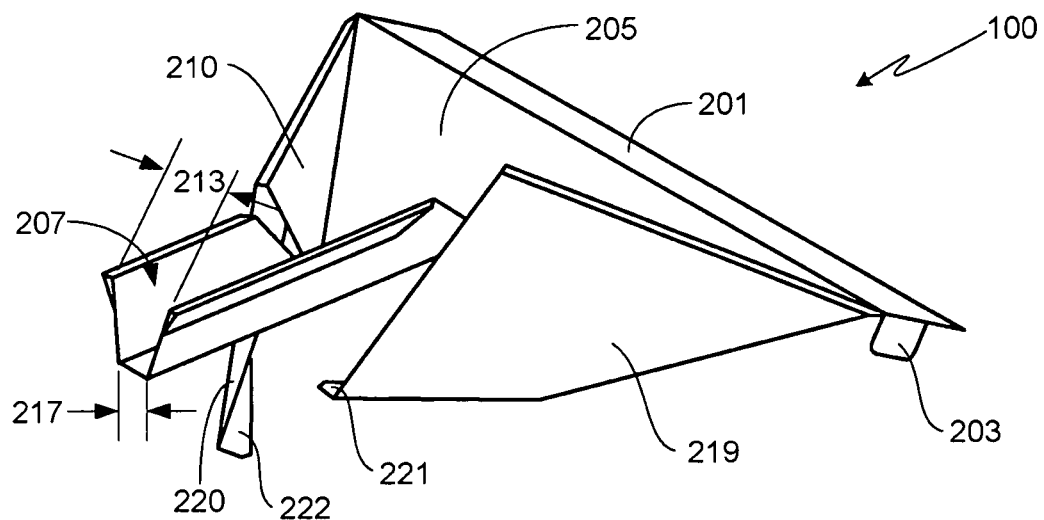
FIG. 4 provides an alternate perspective view of the seedling feeder shown in FIGS. 1-3.
Figure 5:
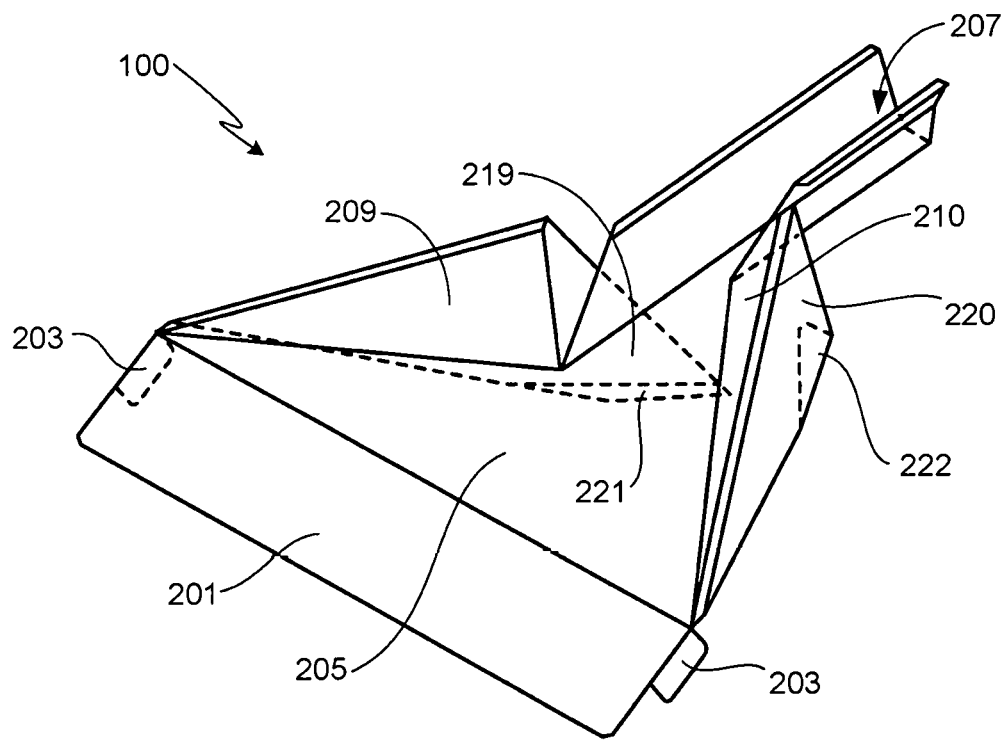
FIG. 5 provides an alternate perspective view of the seedling feeder shown in FIGS. 1-4.
Figure 6:
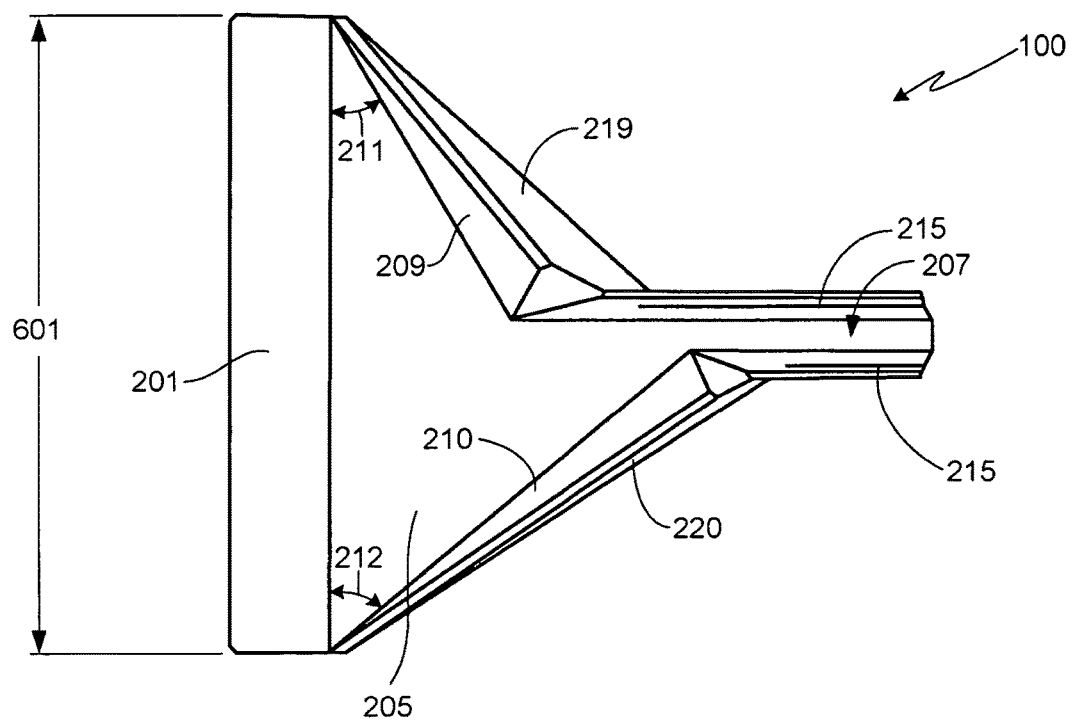
FIG. 6 provides a top view of the seedling feeder shown in FIGS. 1-5.

FIGS. 2 and 3 provide left and right perspective views, respectively, of feeder 100. Alternate perspective views of feeder 100 are provided in FIGS. 4 and 5. A top view of feeder 100 is provided in FIG. 6. Seedling feeder 100 is preferably fabricated from a material that is easily manufactured and one that can be readily cleaned. In some embodiments feeder 100 is fabricated from metal (e.g., aluminum, stainless steel, etc.) while in other embodiments feeder 100 is fabricated from plastic (e.g., polyethylene, polypropylene, polyvinyl chloride, polytetrafluoroethylene, etc.).

The leading surface 201 of feeder 100 is designed to provide a smooth transition between seedling tray 101 and the feeder, thus insuring that as the seedlings are fed into the trough they do not catch or otherwise snag as they enter the feeder. Leading surface 201 may also be referred to herein as a transition surface or a transition member. In the preferred embodiment, in readiness for feeding seedlings from tray 101 into trough 105, surface 201 is positioned within tray 101. Tabs 203 are configured to extend into tray 101, thus preventing feeder 100 from being pulled away from tray 101 during the transplanting process. Preferably the width 601 of surface 201 is only slightly smaller than the width of tray 101, thereby further minimizing the risk of the seedlings 103 snagging on an edge or surface of feeder 100. In the illustrated embodiment width 601 is 10.75 inches, although it will be appreciated that this width is based on the dimensions of tray 101 and therefore may vary from this size.

Adjacent to transition surface 201 is the seedling ramp surface 205. Ramp surface 205 connects transition surface 201 to feed chute 207. Adjoining ramp surface 205, and located on either side of surface 205, are guide surfaces 209 and 210. As shown, guide surfaces 209 and 210 extend upwards from the ramp surface, thereby forming ramp sidewalls. Although surfaces 209/210 may be perpendicular to ramp surface 205, preferably they are angled in order to help self-right the seedlings as they move from tray 101 to chute 207. The angle of surfaces 209 and 210 is preferably in the range of 10 to 45 degrees off perpendicular (i.e., in the range of 100 to 135 degrees from the ramp surface), and more preferably in the range of 15 to 35 degrees off perpendicular (i.e., in the range of 105 to 125 degrees from the ramp surface), where perpendicular is relative to ramp surface 205.

Surfaces 209 and 210 are also defined by angles 211 and 212, respectively. The inventors have found that by making these two angles different, as shown, the seedlings are able to consistently self-right during the transplanting process. In the preferred embodiment angles 211 and 212 are 30 degrees and 40 degrees, respectively, although the inventors have found that a range of angles still accomplish the goal of seedling self-righting. Preferably one of these two angles is in the range of 25 to 45 degrees, and the other angle is in the range of 35 to 60 degrees. As previously noted, preferably these two angles are different, where the difference between the two angles is in the range of 5 to 15 degrees.

Chute 207 is configured to align with the slot opening 107 in trough 105. As such, the width 213 of chute 207 is of approximately the same size as the width of slot 107. If the chute width 213 is much smaller than slot width 109, the seedlings are needlessly compressed during the transplanting process. Conversely, if the chute width 213 is much larger than slot width 109, a portion of the seedling may snag on an edge of slot 107, thereby needlessly damaging the seedling during the transplanting process. Therefore width 213 of chute 207 is preferably the same as width 109 of slot 107, or within plus or minus 0.25 inches.

Although feed chute 207 may utilize perpendicular side walls, preferably side walls 215 are angled as shown. The inventors have found that by angling chute side walls 215, when the seedlings and the accompanying media strips, which are described further below, are fed into trough 105, the additional space between the lower portion of the feed chute and the trough walls allows the media to more freely enter the trough. As a result of this approach, the force required to draw the seedlings and accompanying media strips into the trough is minimized, as is the potential for the media strips to snag on the trough edges. In the preferred embodiment, the upper width 213 of chute 207 is 1.25 inches (±0.25 inches) and the lower width 217 of chute 207 is 0.5 inches (±0.13 inches).

In addition to the features noted above, integral to the preferred embodiment of feeder 100 are legs 219 and 220. Legs 219/220 place feeder 100 at the correct height relative to the underlying table or work bench, and relative to feed tray 101 and trough 105. Integrated into the bottom surfaces of legs 219 and 220 are feet 221 and 222, respectively.

Figure 7:
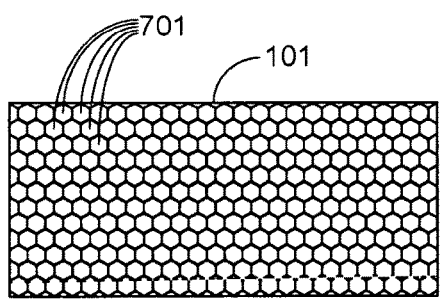
FIG. 7 provides a detailed view of a seedling tray, such as that shown in FIG. 1, after the chain pots have been inserted into the tray but prior to the inclusion of the growing medium and seeds.
Figure 8:
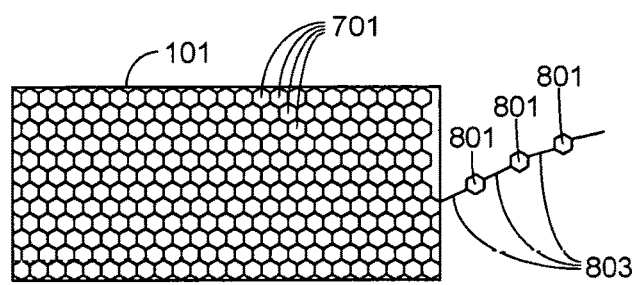
FIG. 8 illustrates the beginning stages of the unraveling of the chain pots within the seedling tray shown in FIG. 7.

FIG. 7 illustrates seedling tray 101 after insertion of the paper chain pots, but before the individual cells of the paper chain pots have been filled with growing medium (e.g., soil) and seeds. As known by those of skill in the art, prior to use the chain pots, which are fabricated from paper or other suitable material, are compressed into a flat. Once unfolded and held within the seedling tray, the initial flat becomes a honeycomb of individual cells 701 that are configured to hold a small portion of a suitable seedling growth medium as well as a seed. As shown in FIG. 7, during seedling growth, and while the cells are located within the seedling tray, the honeycomb of individual cells 701 is maintained in a tightly packed arrangement. Once the seedlings are ready for transplanting, a combination of water soluble and water insoluble glues allows the chain pots to unravel into a series of individual pots linked together by a predetermined length of paper (or other material). FIG. 8 illustrates the beginning stages of the unraveling process, the figure showing several individual cells 801 being pulled out of tray 101 and away from the remaining cells. Also visible in this figure is the strip 803 that unfolds as the chain pots are withdrawn from the tray and which links the cells together. As illustrated, once the first pot of the series is pulled, the remaining pots unravel in a chain-like fashion.

Figure 9:
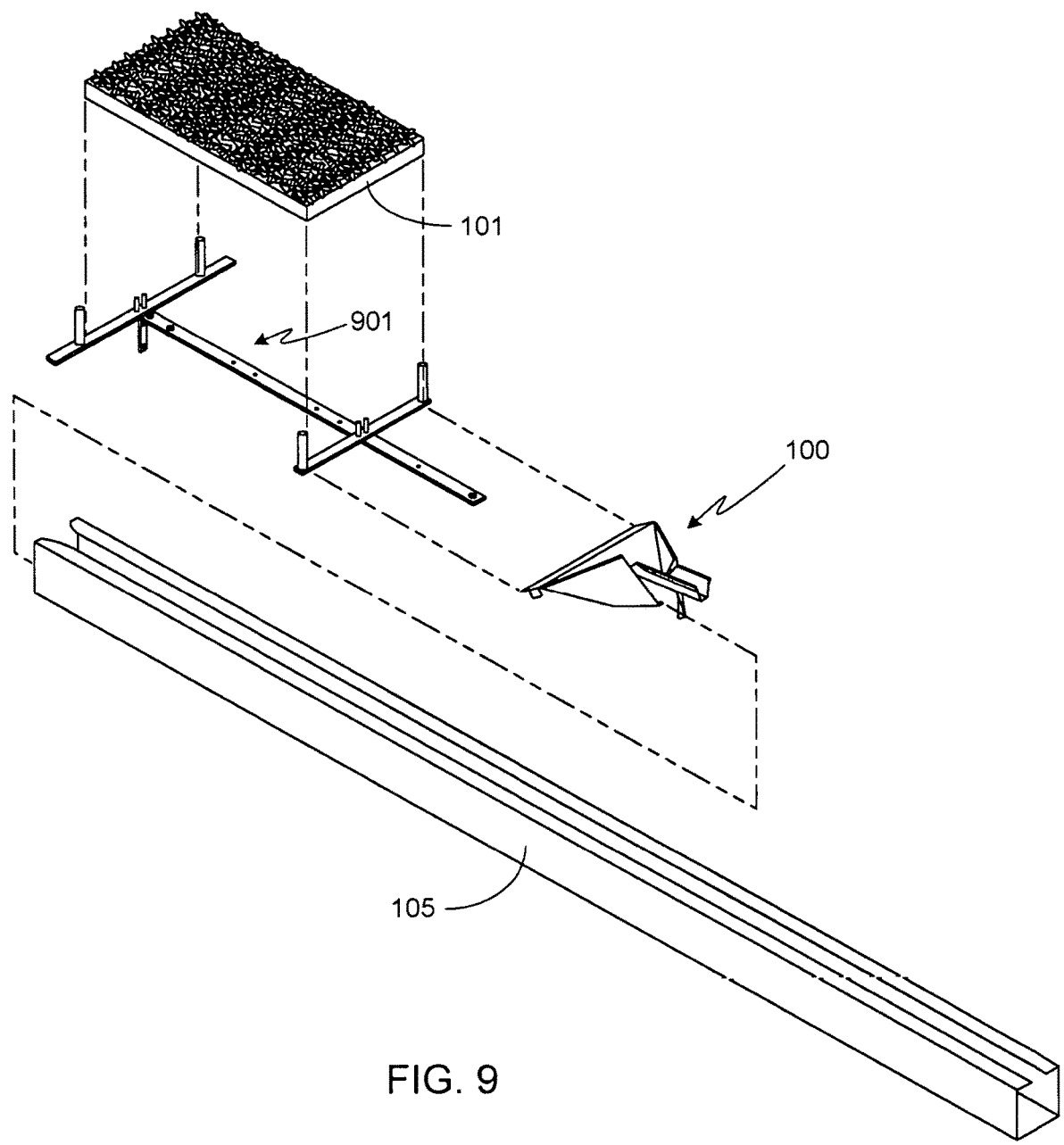
FIG. 9 illustrates the placement of the seedling tray, seedling feeder and trough relative to a restraining jig.
Figure 10:
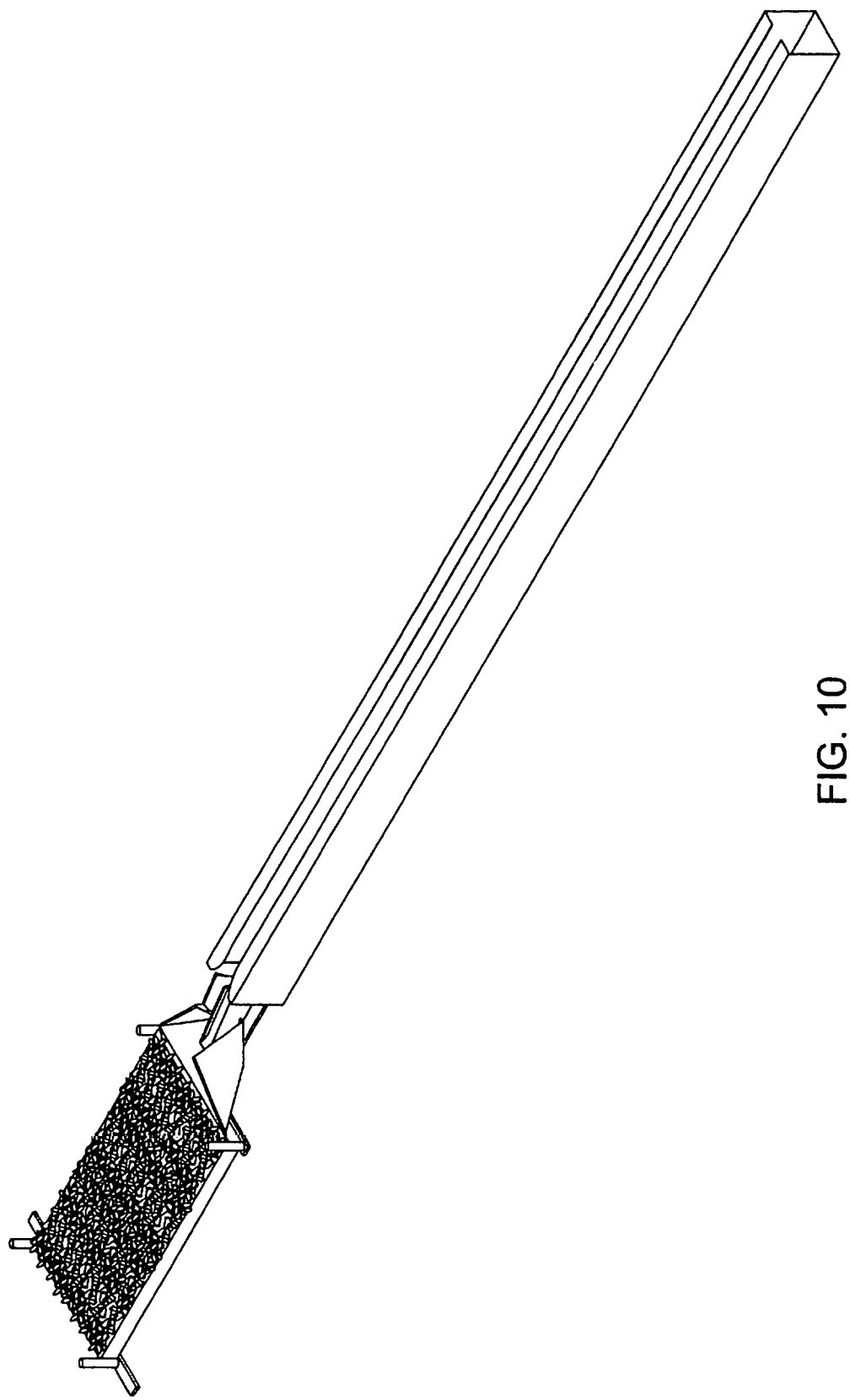
FIG. 10 illustrates the seedling tray, seedling feeder and trough shown in FIG. 9 after mounting to the restraining jig.
Figure 11:
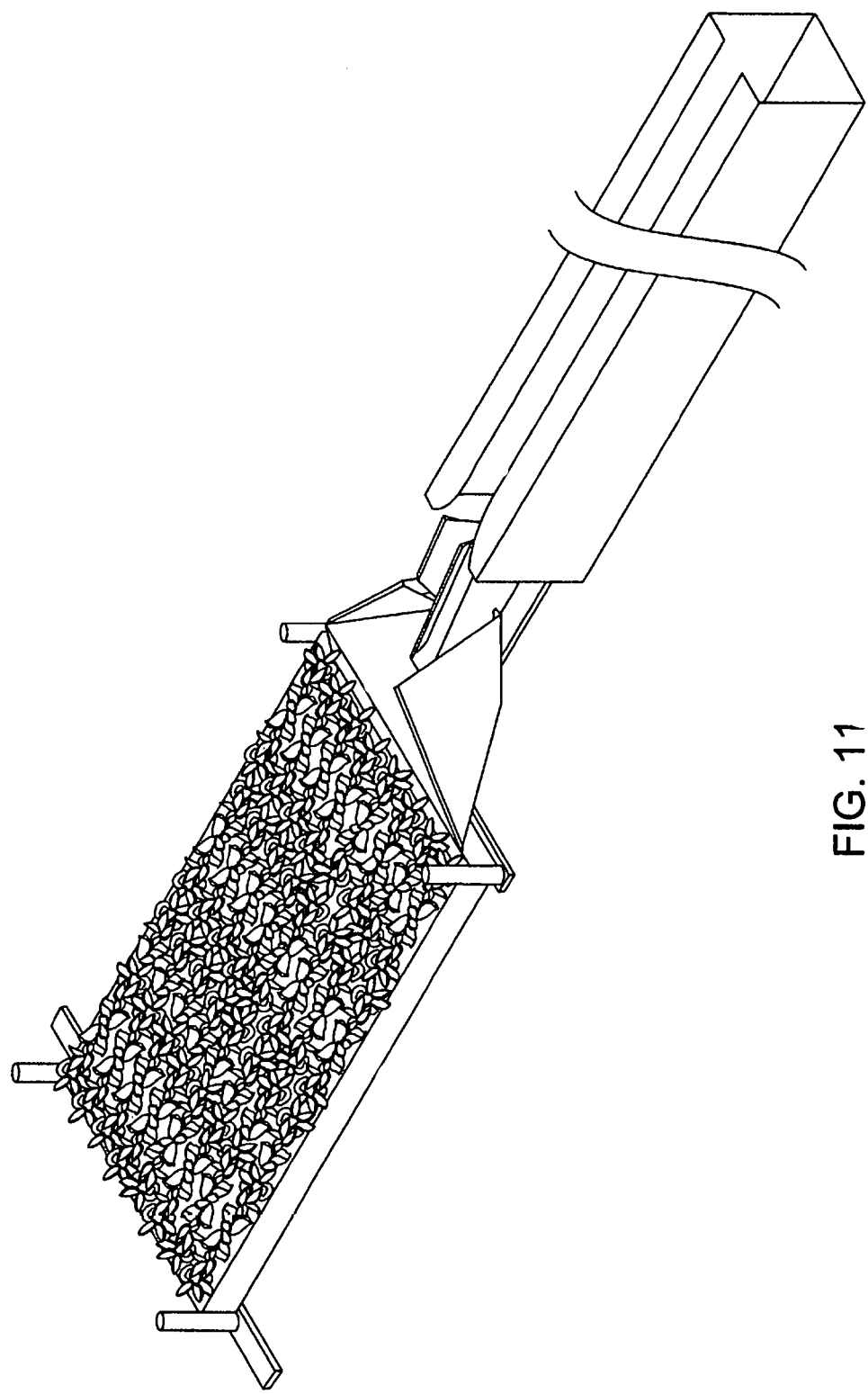
FIG. 11 provides a detailed view of the seedling tray, seedling feeder, trough and restraining jig shown in FIGS. 9 and 10.

Although not required, the inventors have found that it is beneficial to hold seedling tray 101 in a restraining jig 901 during the transplanting process as shown in FIG. 9. Restraining jig 901 maintains the relative positions of tray 101, seedling feeder 100 and trough 105 during the process of transferring the seedlings from the tray to the trough. FIG. 9 illustrates the placement of tray 101, feeder 100 and trough 105 relative to restraining jig 901. FIG. 10 illustrates these same components after mounting while FIG. 11 provides a more detailed view of the mounted components.

Figure 12:
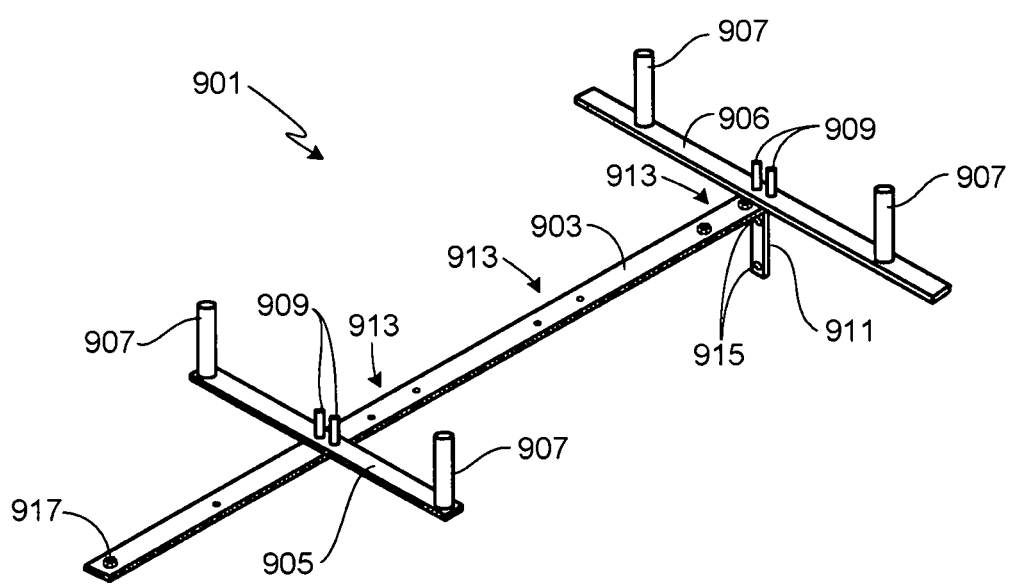
FIG. 12 provides a perspective view of the restraining jig shown in FIGS. 9-11.

FIG. 12 provides a detailed view of a preferred embodiment of a restraining jig. It should be understood that while a restraining jig simplifies the process of transferring seedlings from tray 101 to trough 105 via feeder 100, it is not required. Additionally, while the design of the restraining jig shown in FIG. 12 is preferred, alternative designs that hold the components in the desired positions during the transfer process may also be used.

As shown in FIG. 12, restraining jig 901 includes a central frame member 903 and a pair of cross-frame members 905 and 906. A locating pin 907 is positioned near the end of each of the cross-frame members 905 and 906. In the preferred configuration, the locating pins are adjacent to the corners of tray 101 as shown in FIG. 10, thus preventing the tray from rotating as the seedlings are pulled away from the tray. Additionally jig 901 includes one or more restraining pins 909 that are used to properly position the tray within the jig and prevent the tray from moving forward during the transplanting process. Preferably restraining pins 909 are configured to fit into the lip of tray 101, although it will be appreciated that the same functionality may be achieved by the pins mating to any complimentary tray structure, for example locating holes placed within the edge of the tray during its fabrication.

In addition to restraining the seedling tray, preferably restraining jig 901 also includes features that prevent movement of the jig and tray during the transplanting process. As shown, a bracket member 911 is attached to the bottom of central frame member 903, thus allowing it to rest against the side of the table or workbench used during the transplanting process. Preferably bracket member 911 is configured to be mountable at a number of locations 913, thereby providing additional flexibility to the end user. If desired, bracket member 911 can be permanently or semi-permanently bolted to the underlying table or workbench via bolt holes 915.

In the preferred embodiment of restraining jig 901, a locating pin 917 is fixed to the front portion of central frame member 903 as shown. Pin 917 is configured to fit within an aperture in the bottom surface of trough 105, the combination of pin 917 and the trough aperture preventing the trough from sliding on the table or workbench during the transplanting process.

FIGS. 13-15 schematically illustrate the transplanting process with FIG. 13 showing the set-up immediately prior to transplanting, FIG. 14 showing the initiation of the process in which the first seedling and the ends of the growth media strips are pushed into the end of the trough, and FIG. 15 showing the process after a couple of seedlings have been moved from the seedling tray 101 to the trough 105. As illustrated in these figures, in addition to the seedlings, feeder and trough, a pair of growth media strips 1301/1302 are visible. Growth media strips 1301/1302, which are known by those of skill in the art, are typically fabricated from a fibrous material, for example plastic. These media strips hold the seedlings in place during plant growth and provide a suitable support system for each plant's root structure while helping to capture moisture and nutrients. Preferably a wicking medium (not visible) is at least partially wrapped around each media strip 1301/1302, the wicking medium being used to transport moisture and nutrients along the tower to the individual plants.

Initially the leading ends of the media strips 1301/1302 and the first seedling are fed by hand into the end of trough 105 as illustrated in FIG. 14. As illustrated, preferably pin 917 located on restraining jig 901 positions the end surface of trough 105 a small distance, typically on the order of 0.25 to 2 inches, from the end of the feed chute. This separation distance allows media strips 1301/1302 to easily slide past the feed chute as they are drawn into the trough. After a small portion of the media strips 1301/1302 and the first seedling are pushed into the end of trough 105, a tool is used to pull the media strips in a direction 1401 into the trough. Since the first seedling has already been captured by the media strips during the first step, pulling the media strips into the trough causes the linked chain pots to also be drawn into the trough. FIG. 15 illustrates the process after the first three chain pots 1501-1503 have been pulled into the trough along with a portion of each of the media strips.

Figure 16A:
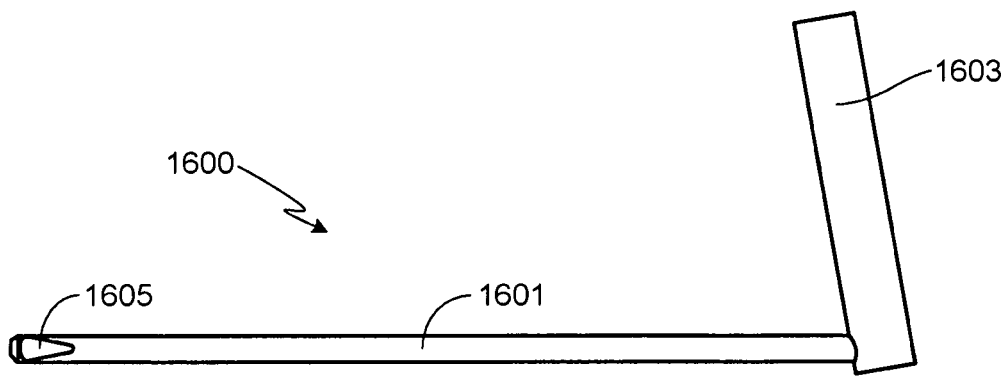
FIG. 16A provides a side view of a tool that can be used to pull the media strips as well as the captured seedlings into the trough.
Figure 16B:
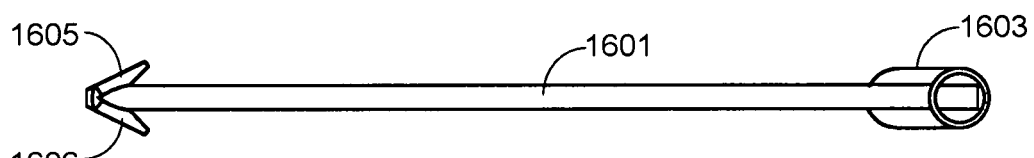
FIG. 16B provides a bottom view of the tool shown in FIG. 16A.

FIGS. 16A and 16B provide side and bottom views, respectively, of a tool 1600 that can be used to pull the media strips, along with the chain pots, through the trough. Tool 1600 includes a rod 1601, preferably a cylindrical rod, which is attached to a handle 1603. Handle 1603 is sized such that it can freely pass through slot 107 in trough 105. Attached to rod 1601, at a location distal from handle 1603, are first and second barbs 1605/1606.

To use tool 1600, the media strips 1301/1302 are first inserted into the end of trough 105 as described above relative to FIG. 14. Tool 1600 can either be slid through the trough until the barbs 1605/1606 hook the ends of the media strips or, more preferably, rod 1601 is inserted sideways through slot 107 such that the barbs fit between the two media strips 1301/1302. Then using handle 1603 rod 1601 is rotated, thereby causing barbs 1605/1606 to pierce the inside surfaces of media strips 1301/1302. Once the barbs have penetrated the inner surfaces of the media strips, pulling handle 1603 causes the media strips along with the captured paper pots to be drawn through the trough.

Figure 17A:
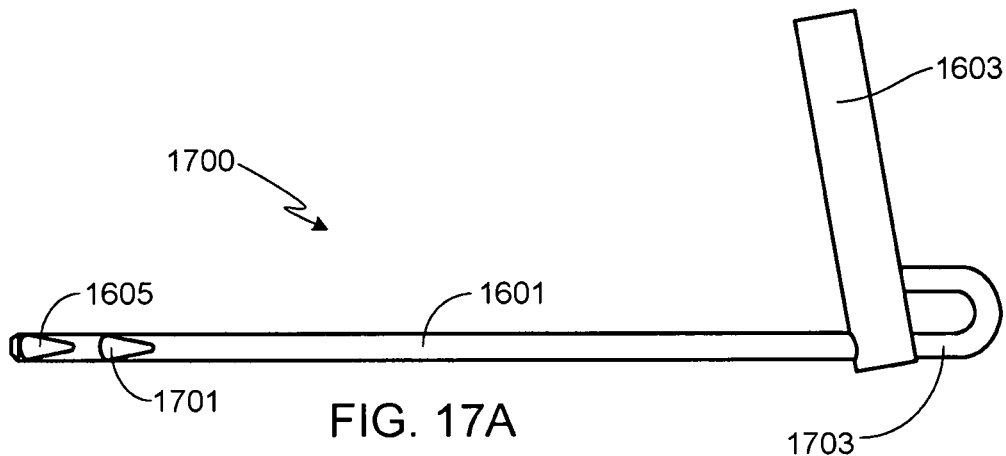
FIG. 17A provides a side view of an alternate tool that can be used to pull the media strips as well as the captured seedlings into the trough.
Figure 17B:
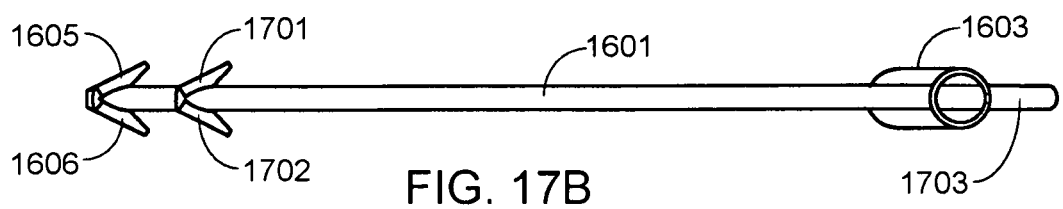
FIG. 17B provides a bottom view of the tool shown in FIG. 17A.

FIGS. 17A and 17B provide side and bottom views, respectively, of an alternate tool 1700 that can be used to pull the media strips, along with the chain pots, through the trough. Tool 1700 includes a second set of barbs 1701/1702, thus helping to securely capture the ends of the media strips. Additionally, tool 1700 includes a loop 1703 on the back of the handle.

Figure 18:
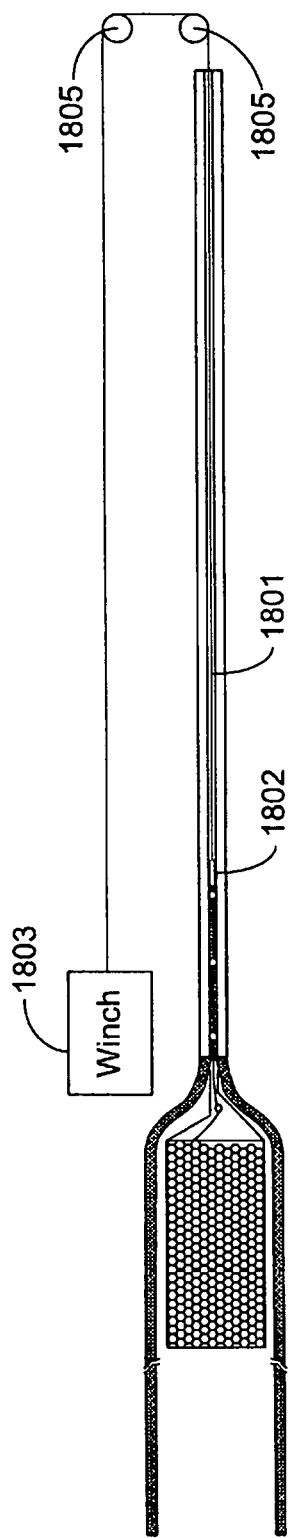
FIG. 18 schematically illustrates a system similar to that shown in FIGS. 13-15 except for the use of a winch to pull the media strips and seedlings into the trough.

FIG. 18 illustrates an augmented media strip/paper pot pulling system. The system is the same as previously described except that a cable 1801 is attached to the pulling handle 1802, for example using loop 1703. Cable 1801 is attached to a small electric winch 1803. Winch 1803 can be located at the end of trough 105, opposite tray 101 and seedling feeder 100. Alternately, and as shown, cable 1801 can pass through a pulley system 1805, thereby allowing winch 1803 to be located closer to the feeder. Preferably winch 1803 is controlled by a foot switch, thus freeing up the user's hands to help feed the media strips and the seedlings into the trough as the winch pulls on them.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A seedling transplanting system, comprising:
a seedling tray containing a plurality of seedlings;
a hydroponic trough; and
a seedling feeder, said seedling feeder configured to fit between said seedling tray and said hydroponic trough during a transplanting process, said seedling feeder comprising:
a ramp surface, wherein said seedlings from said seedling tray pass over said ramp surface during said transplanting process;
a transition member located at a first end portion of said seedling feeder, said transition member configured to provide a transition surface between said seedling tray and said ramp surface;
a feed chute located at a second end portion of said seedling feeder, wherein said second end portion is distal from said first end portion, said feed chute configured to guide said seedlings passing over said ramp surface into said hydroponic trough;
a first guide surface interposed between said transition member and said feed chute, said first guide surface defining a first edge of said ramp surface, said first guide surface extending upwards from said ramp surface to form a first ramp sidewall, wherein said first guide surface angles away from said transition member at a first acute angle; and
a second guide surface interposed between said transition member and said feed chute, said second guide surface defining a second edge of said ramp surface, said second guide surface extending upwards from said ramp surface to form a second ramp sidewall, wherein said second guide surface angles away from said transition member at a second acute angle, wherein said first acute angle is different from said second acute angle.

2. The seedling transplanting system of claim 1, said plurality of seedlings contained within a plurality of chain pots.

3. The seedling transplanting system of claim 1, wherein said hydroponic trough is configured to be placed in an upright, vertical position after completion of said transplanting process and during a growth cycle of said seedlings.

4. The seedling transplanting system of claim 1, said first acute angle within a first angular range of 25 to 45 degrees, and said second acute angle within a second angular range of 35 to 60 degrees.

5. The seedling transplanting system of claim 4, wherein a difference between said first acute angle and said second acute angle is between 5 and 15 degrees.

6. The seedling transplanting system of claim 1, wherein said first guide surface forms a first obtuse angle with said ramp surface, and wherein said second guide surface forms a second obtuse angle with said ramp surface.

7. The seedling transplanting system of claim 6, said first obtuse angle and said second obtuse angle within an angular range of 100 to 135 degrees.

8. The seedling transplanting system of claim 1, wherein during said transplanting process said transition member is configured to extend over a leading edge of said seedling tray and fit at least partially within said seedling tray.

9. The seedling transplanting system of claim 8, said transition member further comprising a pair of tabs, said pair of tabs extending downwards from said transition member, and wherein during said transplanting process said pair of tabs is configured to extend into said seedling tray.

10. The seedling transplanting system of claim 1, said first guide surface and said second guide surface configured to right said seedlings during said transplanting process and before said seedlings move into said feeder chute.

11. The seedling transplanting system of claim 1, wherein a first width corresponding to said feeder chute is within plus or minus 0.25 inches of a second width corresponding to a slot within said hydroponic trough.

12. The seedling transplanting system of claim 1, wherein a first sidewall and a second sidewall corresponding to said feeder chute are angled such that a first chute width corresponding to an upper portion of said feeder chute is larger than a second chute width corresponding to a lower portion of said feeder chute.

13. The seedling transplanting system of claim 1, further comprising a restraining jig, said restraining jig configured to hold said seedling tray during said transplanting process.

14. The seedling transplanting system of claim 13, said restraining jig further comprising at least one restraining pin, said at least one restraining pin configured to fit within at least one complimentary feature of said seedling tray when said seedling tray is mounted to said restraining jig during said transplanting process.

15. The seedling transplanting system of claim 13, said restraining jig further comprising a plurality of locating pins configured to position said seedling tray within said restraining jig when said seedling tray is mounted to said restraining jig during said transplanting process.

16. The seedling transplanting system of claim 13, said restraining jig further comprising a mounting bracket coupled to a lower surface of said restraining jig, said mounting bracket configured to minimize movement of said restraining jig during said transplanting process.

17. The seedling transplanting system of claim 13, said restraining jig further comprising at least one pin configured to fit within at least one complimentary feature of said hydroponic trough, said at least one pin maintaining said hydroponic trough in position relative to said seedling feeder and said seedling tray during said transplanting process.

18. The seedling transplanting system of claim 1, further comprising a media strip pulling tool configured to pull a pair of media strips along with a plurality of chain pots captured between said pair of media strips into said hydroponic trough during said transplanting process, wherein said plurality of seedlings are contained within said plurality of chain pots.

19. The seedling transplanting system of claim 18, said media strip pulling tool further comprising a plurality of barbs configured to pierce said media strips.

20. The seedling transplanting system of claim 18, further comprising a winch, wherein said winch is coupled to said media strip pulling tool via a cable, said winch and cable configured to pull said media strip pulling tool, said pair of media strips, and said plurality of chain pots through said hydroponic trough during said transplanting process.

* * * * *